Nov. 18, 1969 R. T. SAND 3,478,803
VEHICLE TRACTION DEVICE
Filed July 21, 1967 2 Sheets-Sheet 2
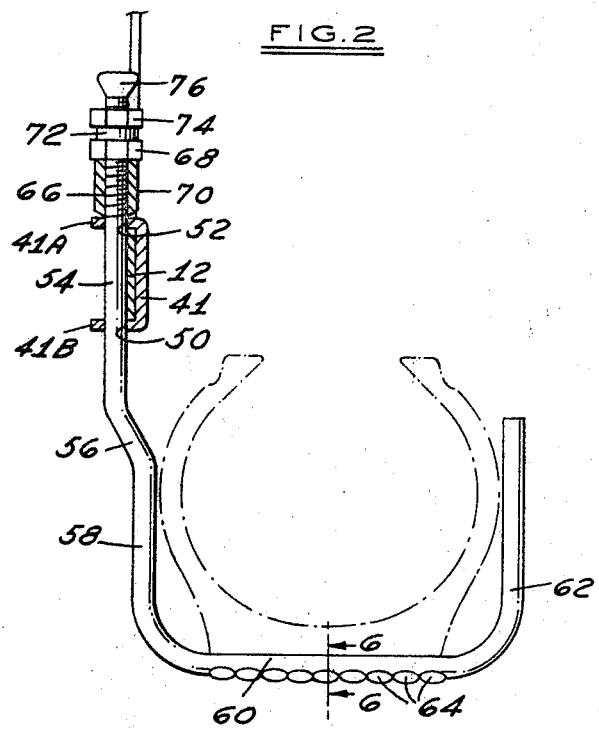
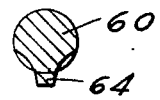
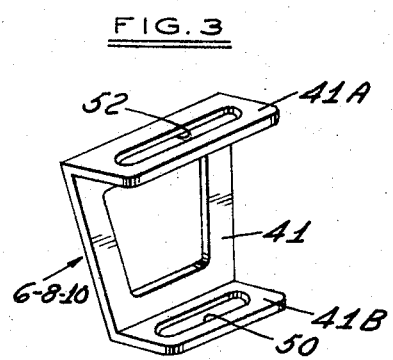
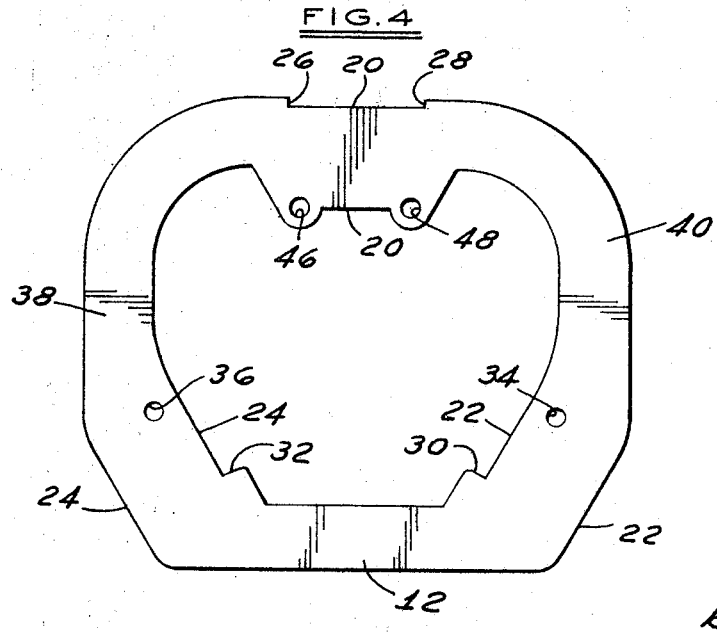
INVENTOR
ROBERT T. SAND
BY
Barnes, Kisselle, Raisch & Choate
ATTORNEYS United States Patent Office 3,478,803
Patented Nov. 18, 1969

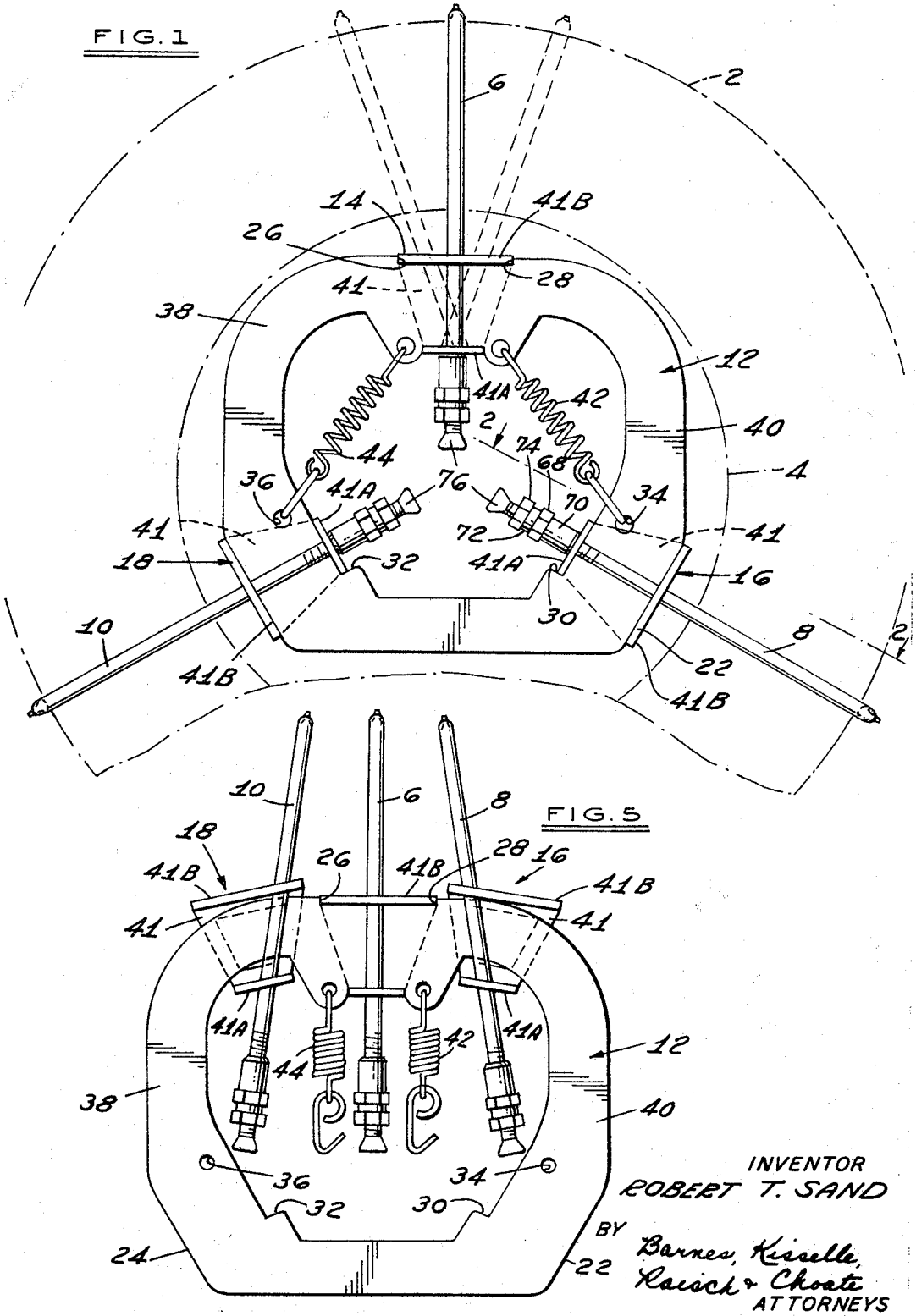

1

3,478,803
VEHICLE TRACTION DEVICE
Robert T. Sand, 5220 McClellan Ave.,
Detroit, Mich. 48213
Filed July 21, 1967, Ser. No. 655,049
Int. Cl. B60c 27/04
U.S. Cl. 152—225
14 Claims

ABSTRACT OF THE DISCLOSURE

A traction device for temporary attachment to a resilient tire on a vehicle wheel having a body portion with circumferentially spaced locating areas for stabilizing radially extending traction elements moved from storage to an operating position, the traction elements being mounted for limited motion about an axis outside the wheel center to utilize the tire to create a resilient restraining action on the elements when circumferential force is applied.

---

This invention relates to traction devices for wheeled vehicles and more particularly to traction devices which are intended for temporary attachment to vehicle wheels when the vehicle encounters icy, snowy, muddy, slippery, or other adverse road surfaces.

A principal object of this invention is to provide a traction device with an improved means of attaching the device to a resilient vehicle wheel so that the device will not rotate relative to the vehicle wheel.

Another object of this invention is to provide a traction device which can be readily mounted on a mired vehicle wheel and easily removed from the wheel without the use of additional tools.

A further object of this invention is to provide a traction device of simple construction that folds into a compact package for shipping and storage in which all the component parts are captive to prevent accidental loss or misplacement.

Other objects and features of this invention will be apparent from the following description and claims in which there is found the manner of making and using the invention and the best mode contemplated by the inventor for carrying out the invention.

Drawings accompany this disclosure and the various views thereof may be briefly described as:

FIGURE 1, a side elevational of the device showing it assembled on a vehicle wheel.

FIGURE 2, a sectional view on line 2—2 of FIGURE 1, showing one of the traction bar elements of the device.

FIGURE 3, a view of the link elements of the device.

FIGURE 4, a view of the body of the device.

FIGURE 5, a view of the traction device positioned for mounting on or removal from a tire casing.

FIGURE 6, a sectional view on line 6—6 of FIGURE 2.

Referring to the drawings:

In FIGURE 1, is a standard vehicle tire 2 and a rim 4. Equally spaced around tire 2 are a plurality of traction elements 6, 8, 10 which are slidably attached to a body 12 by a plurality of guide links 14, 16, 18. Body 12 (as shown in FIGURE 4) is a relatively flat annular plate containing a plurality of parallel chordal surface pairs 20 22, 24, at operating stations, guide stops 26, 28, 30, 32, retainer openings 34, 36 and connection sections 38, 40 narrow enough to allow the guide links 16, 18 to slide freely into position at the operating stations formed by parallel chordal surface pairs 22, 24.

The guide links 14, 16, 18 are each formed with a base in the form of a truncated triangle 41 with an upturned portion 41A, 41B at each end to overlie the edges of the body 12. These ends are each provided with elongate slots 50, 52, respectively, through which passes a portion of a shank 54 of the traction elements. This locks the links on the body. Guide link 14 is fixed in position by ears 43 and stops 26, 28. Links 16, 18 are mounted for sliding motion from a storage position to an operating position. The upturned ends 41A, 41B are positioned to slidably engage the surfaces 22, 24, to stabilize the guide links in the operating position.

The traverse sliding action of guide link 14 on chordal surface pair 20 is permanently limited by guide stops 26, 28 in body 12. The traverse sliding action of guide links 16, 18 on chordal surface pairs 22, 24 is selectively limited by guide stops 30, 32 in body 12 and locking springs 42, 44 hooked in retainer openings 34, 36. The opposite ends of locking springs 42, 44 are captively hooked into openings 46, 48 in body 12 to prevent their loss.

The guide links 14, 16, 18 (as shown in FIGURE 3) each contain two elongated slots 50, 52 of unequal length which allow the traction elements 6, 8, 10 to sweep an arc of finite width with the center of its radius at slot 50, in a plane parallel to the plane of the body 12. Therefore, if a traction element 6, 8, 10 begins to slip on the periphery of the tire casing 2, it will move or "dig" into the tire casing (as shown in FIGURE 1) because the radius of the arc of the traction element 6, 8, 10 is shorter than the radius of tire casing 2. This increases the tension in the traction element 6, 8, 10, thereby more securely attaching the traction device to the tire casing 2.

The traction elements 6, 8, 10 consist of a generally hook shaped element comprising a straight shank end 54, an offset portion 56, a second straight shank portion 58, a leg portion 60 extending at a generally right angle to shank portion 58, and a return hook portion 62 running generally at a right angle to leg portion 60. The leg portion 60 contains spurs 64 (FIGURE 6) to improve the traction of the device. A portion of shank 54 is threaded at 66 to accommodate a threaded nut 68 which secures the traction device to tire 2 by placing the shanks 54 of the traction elements 6, 8, 10 under tension. A spacer 70 is interposed between nut 68 and guide links 14, 16, 18 on shank 54. A washer 72 and a nut 74 lock the nut 68 in place on shank 54. An upset end 76 on shank 54 captivates the washer 72 and nuts 68, 74 on the shank 54 and the traction elements 6, 8, 10 within the guide links 14, 16, 18.

As shown in FIGURE 5, the traction device folds or collapses into a convenient package for easy attachment to or removal from a tire casing. To further facilitate the attachment of the device to a tire casing, the nuts 68 can be preadjusted to minimize the slack in the traction elements 6, 8, 10, prior to placing the device on the tire casing. To provide a compact package for storage, the traction elements 6, 8, 10, can be positioned on the body 12 as shown in FIGURE 5 and then rotated 90° in either direction, thereby permitting the device to lie flat for storage.

What is claimed as new is as follows:

1. A traction device for application to a tire and wheel assembly which comprises:
   (a) a support means to be positioned centrally at the outside of a vehicle wheel,
   (b) means on said support means to provide a plurality of locating areas and track means connecting said areas,
   (c) a plurality of link guide means positionable on said support means at said locating areas, at least two of which are movable on said track means from a position adjacent a first locating area to respective locating areas spaced from said first area,
   (d) means on said support means at said locating areas and means on said link means to stabilize said link means at said areas, and (e) a plurality of traction elements each having a shank end mounted respectively in one said link means and a traction end to extend over the periphery of a tire in assembly.

2. A traction device as defined in claim 1 in which means on said traction elements and means on said link means cooperate to permit movement of said traction elements circumferentially of a vehicle wheel in an arc on a center spaced outwardly from the wheel center to utilize the resilience of the tire to limit rotational movement of said traction device wtih respect to the tire and wheel assembly.

3. A traction device for application to a tire and wheel assembly which comprises:
   (a) a support means formed of rigid material extending annularly and having thereon a plurality of locating areas,
   (b) a plurality of link means mounted on said support means at least two of which are movable from a position adjacent a first locating area to respective locating areas spaced from said first areas,
   (c) means on said support means at said locating areas and means on said link means to stabilize said link means at said areas, and
   (d) a plurality of traction elements each having a shank end mounted respectively in one said link means and a traction end to extend over the periphery of a tire in assembly.

4. A traction device as defined in claim 3 in which the means on said support means at said locating areas to stabilize said link means comprises radially spaced chordal surfaces, and the means on said link means to stabilize said link means comprises parallel surface means spaced to having a sliding engagement with said chordal surfaces.

5. A traction device as defined in claim 3 in which said link means comprises a plate means and upturned parallel end portions thereon to embrace the said support means respectively on inner and outer surfaces thereof, the shank portion of said traction elements each extending through apertures in said end portions to hold said link means captive on said support means.

6. A traction device as defined in claim 5 in which the apertures in said end portions are elongate in the direction of the plane of said support means to permit a limited pivotal movement of said shank means about a point outside the center of said support means.

7. A traction device as defined in claim 3 in which the support means between said locating areas has a radial dimension less than that at said locating areas to facilitate movement of said link means between said areas.

8. A traction device for application to a tire and wheel assembly which comprises:
   (a) a relatively flat annular central body having a plurality of guide link locating areas each having a pair of opposed edges,
   (b) a plurality of guide link means on said body adapted to cooperate with said pairs of opposed edges,
   (c) a plurality of generally hook-shaped traction elements having one end captive in said guide link means and being axially and rotatably movable in said guide link means, and
   (d) means locking said guide link means on said body in said locating areas to prevent circumferential movement of said guide link means around said body.

9. A traction device as defined in claim 8 in which the central body comprises a flat annular plate with a plurality of parallel chordal edge pairs with a guide stop at one end and a parallel chordal edge pair with a guide stop at both ends.

10. A traction device as defined in claim 8 in which the guide links are generally U-shaped plates with an elongated opening in each leg located directly opposite each other with their major axes parallel to each other and to the plane of the base of the U-shaped link.

11. A traction device as defined in claim 8 in which the means of locking the guide link means to the central body comprises:
    (a) a link stop formed as an integral part of said body,
    (b) parallel chordal edge pair formed as an integral part of said body,
    (c) retainer openings formed in said body, and
    (d) removable stop inserted in said openings.

12. A traction device as defined in claim 8 in which the means of locking the guide link means to the central body comprises:
    (a) parallel chordal edge pair formed as an integral part of said body, and
    (b) link stops at each end of said chordal edge pair.

13. In a device for supporting traction elements for a wheel and tire assembly,
    (a) a central body for a traction device which comprises a flat annular plate with a plurality of pairs of parallel chordal edges, and
    (b) a plurality of mounting means for traction elements having surfaces to engage said respective pairs of chordal edges to stabilize said mounting means in an operating position.

14. In a device for supporting traction elements for a wheel and tire assembly,
    (a) a central body for a traction device which comprises a flat annular plate with a plurality of pairs of parallel chordal edges with a link stop at one end, and a parallel chordal edge pair with link stop at both ends, and
    (b) a plurality of mounting means for traction elements having surfaces to engage said respective pairs of chordal edges to stabilize said mounting means in an operating position.

References Cited

UNITED STATES PATENTS

| | | | |
|---|---|---|---|
| 2,169,950 | 8/1939 | Hamalainen | 152—228 |
| 2,458,522 | 1/1949 | MacKay | 152—229 |
| 2,575,263 | 11/1951 | Eisenhauer | 152—225 |
| 2,912,036 | 11/1959 | Minutilla | 152—225 |

ARTHUR L. LA POINT, Primary Examiner